United States Patent
Lawrence et al.

(10) Patent No.: US 11,094,487 B2
(45) Date of Patent: Aug. 17, 2021

(54) CURRENT INTERRUPT DEVICE BASED ON THERMAL ACTIVATION OF FRANGIBLE GLASS BULB

(71) Applicant: 24M Technologies, Inc., Cambridge, MA (US)

(72) Inventors: Ryan Michael Lawrence, Providence, RI (US); Richard K. Holman, Wellesley, MA (US)

(73) Assignee: 24M Technologies, Inc., Cambridge, MA (US)

( * ) Notice: Subject to any disclaimer, the term of this patent is extended or adjusted under 35 U.S.C. 154(b) by 240 days.

(21) Appl. No.: 16/450,231

(22) Filed: Jun. 24, 2019

(65) Prior Publication Data

US 2019/0393477 A1    Dec. 26, 2019

Related U.S. Application Data

(60) Provisional application No. 62/689,460, filed on Jun. 25, 2018.

(51) Int. Cl.
| | |
|---|---|
| *H01H 37/32* | (2006.01) |
| *H01M 10/44* | (2006.01) |
| *H01H 39/00* | (2006.01) |
| *H01M 50/581* | (2021.01) |

(52) U.S. Cl.
CPC ............ *H01H 37/32* (2013.01); *H01H 39/00* (2013.01); *H01M 10/443* (2013.01); *H01M 50/581* (2021.01); *H01H 2039/008* (2013.01); *H01M 2200/10* (2013.01)

(58) Field of Classification Search
CPC ...... H01H 37/32; H01H 37/36; H01H 37/764; H01H 39/00; H01H 2039/008; H01M 10/443; H01M 50/581; H01M 2200/10
See application file for complete search history.

(56) References Cited

U.S. PATENT DOCUMENTS

| | | | | |
|---|---|---|---|---|
| 4,252,869 A | * | 2/1981 | Heitz ................. | H01M 50/572 429/49 |
| 4,829,390 A | * | 5/1989 | Simon ................ | H01H 39/00 361/49 |
| 5,169,732 A | * | 12/1992 | Beldock ............. | H01M 50/543 429/150 |
| 5,967,238 A | * | 10/1999 | Pepi .................... | A62C 37/14 169/37 |
| 8,722,226 B2 | | 5/2014 | Chiang et al. | |

(Continued)

*Primary Examiner* — Jacob R Crum
(74) *Attorney, Agent, or Firm* — Cooley LLP (57) ABSTRACT

Embodiments described herein relate generally to a current interrupt device (CID) including a frangible bulb that is configured to be thermally triggered. In some embodiments, the CID includes a breaking contact electrically coupled to a fixed contact and held in electrical contact by the frangible bulb. In some embodiments, the frangible bulb is configured to break at a temperature threshold. In some embodiments, the breaking contact is configured to bend, rotate and/or otherwise deform about a hinge point in order to become electrically disconnected from the fixed contact when the frangible bulb breaks. In some embodiments, opening the electrical circuit between the breaking contact and the fixed contact may prevent overcharging, overvoltage conditions, overcurrent conditions, thermal runaway, and/or other catastrophic failure events.

18 Claims, 5 Drawing Sheets

(56) References Cited

U.S. PATENT DOCUMENTS

| | | |
|---|---|---|
| 8,722,227 B2 | 5/2014 | Chiang et al. |
| 8,778,552 B2 | 7/2014 | Chiang et al. |
| 8,993,159 B2 | 3/2015 | Chiang et al. |
| 9,153,833 B2 | 10/2015 | Chiang et al. |
| 9,178,200 B2 | 11/2015 | Bazzarella et al. |
| 9,184,464 B2 | 11/2015 | Chiang et al. |
| 9,203,092 B2 | 12/2015 | Slocum et al. |
| 9,293,781 B2 | 3/2016 | Chiang et al. |
| 9,362,583 B2 | 6/2016 | Chiang et al. |
| 9,385,392 B2 | 7/2016 | Chiang et al. |
| 9,401,501 B2 | 7/2016 | Bazzarella et al. |
| 9,437,864 B2 | 9/2016 | Tan et al. |
| 9,484,569 B2 | 11/2016 | Doherty et al. |
| 9,583,780 B2 | 2/2017 | Chiang et al. |
| 9,614,231 B2 | 4/2017 | Carter et al. |
| 9,786,944 B2 | 10/2017 | Chiang et al. |
| 9,812,674 B2 | 11/2017 | Bazzarella et al. |
| 9,825,280 B2 | 11/2017 | Chiang et al. |
| 9,831,518 B2 | 11/2017 | Chiang et al. |
| 9,831,519 B2 | 11/2017 | Chiang et al. |
| 9,831,522 B2 | 11/2017 | Tan et al. |
| 9,991,697 B1 * | 6/2018 | Howard .................. H01C 7/12 |
| 10,115,970 B2 | 10/2018 | Ota et al. |
| 10,122,044 B2 | 11/2018 | Tan et al. |
| 10,153,651 B2 | 12/2018 | Taylor et al. |
| 10,181,587 B2 | 1/2019 | Ota et al. |
| 10,230,128 B2 | 3/2019 | Chiang et al. |
| 10,236,518 B2 | 3/2019 | Chiang et al. |
| 10,411,310 B2 | 9/2019 | Chiang et al. |
| 10,483,582 B2 | 11/2019 | Chiang et al. |
| 10,497,935 B2 | 12/2019 | Ota et al. |
| 10,522,870 B2 | 12/2019 | Tan et al. |
| 2010/0047671 A1 | 2/2010 | Chiang et al. |
| 2010/0323264 A1 | 12/2010 | Chiang et al. |
| 2011/0189520 A1 | 8/2011 | Carter et al. |
| 2011/0200848 A1 | 8/2011 | Chiang et al. |
| 2011/0274948 A1 | 11/2011 | Duduta et al. |
| 2012/0164499 A1 | 6/2012 | Chiang et al. |
| 2013/0055559 A1 | 3/2013 | Slocum et al. |
| 2013/0065122 A1 | 3/2013 | Chiang et al. |
| 2013/0309547 A1 | 11/2013 | Bazzarella et al. |
| 2013/0337319 A1 | 12/2013 | Doherty et al. |
| 2014/0004437 A1 | 1/2014 | Slocum et al. |
| 2014/0030623 A1 | 1/2014 | Chiang et al. |
| 2014/0039710 A1 | 2/2014 | Carter et al. |
| 2014/0154546 A1 | 6/2014 | Carter et al. |
| 2014/0170524 A1 | 6/2014 | Chiang et al. |
| 2014/0248521 A1 | 9/2014 | Chiang et al. |
| 2014/0315097 A1 | 10/2014 | Tan et al. |
| 2015/0024279 A1 | 1/2015 | Tan et al. |
| 2015/0129081 A1 | 5/2015 | Chiang et al. |
| 2015/0140371 A1 | 5/2015 | Slocum et al. |
| 2015/0171406 A1 | 6/2015 | Bazzarella et al. |
| 2015/0280267 A1 | 10/2015 | Chiang et al. |
| 2015/0295272 A1 | 10/2015 | Chiang et al. |
| 2015/0357626 A1 | 12/2015 | Holman et al. |
| 2016/0013507 A1 | 1/2016 | Chiang et al. |
| 2016/0056490 A1 | 2/2016 | Chiang et al. |
| 2016/0056491 A1 | 2/2016 | Chiang et al. |
| 2016/0105042 A1 | 4/2016 | Taylor et al. |
| 2016/0126543 A1 | 5/2016 | Ota et al. |
| 2016/0133916 A1 | 5/2016 | Zagars et al. |
| 2016/0190544 A1 | 6/2016 | Slocum et al. |
| 2016/0218375 A1 | 7/2016 | Chiang et al. |
| 2016/0268621 A1 | 9/2016 | Chiang et al. |
| 2016/0308218 A1 | 10/2016 | Ota et al. |
| 2016/0344006 A1 | 11/2016 | Ota et al. |
| 2016/0372802 A1 | 12/2016 | Chiang et al. |
| 2017/0018798 A1 | 1/2017 | Tan et al. |
| 2017/0025646 A1 | 1/2017 | Ota et al. |
| 2017/0025674 A1 | 1/2017 | Tan et al. |
| 2017/0033389 A1 | 2/2017 | Chiang et al. |
| 2017/0033390 A1 | 2/2017 | Chiang et al. |
| 2017/0077464 A1 | 3/2017 | Bazzarella et al. |
| 2017/0162863 A1 | 6/2017 | Doherty et al. |
| 2017/0214034 A1 | 7/2017 | Ota et al. |
| 2017/0237111 A1 | 8/2017 | Holman et al. |
| 2017/0237112 A1 | 8/2017 | Holman et al. |
| 2017/0288281 A1 | 10/2017 | Chiang et al. |
| 2018/0034090 A1 | 2/2018 | Chiang et al. |
| 2018/0159321 A1 * | 6/2018 | Howard .................. H02H 9/042 |
| 2018/0175428 A1 | 6/2018 | Chiang et al. |
| 2018/0175445 A1 | 6/2018 | Tan et al. |
| 2018/0233708 A1 | 8/2018 | Bazzarella et al. |
| 2018/0233722 A1 | 8/2018 | Holman et al. |
| 2018/0287220 A1 | 10/2018 | Woodford et al. |
| 2019/0036101 A1 | 1/2019 | Tyler et al. |
| 2019/0058184 A1 | 2/2019 | Bazzarella et al. |
| 2019/0245242 A1 | 8/2019 | Tan et al. |
| 2019/0319460 A1 | 10/2019 | Taylor et al. |
| 2019/0326562 A1 | 10/2019 | Ota et al. |
| 2019/0348705 A1 | 11/2019 | Chen et al. |
| 2019/0355998 A1 | 11/2019 | Chiang et al. |
| 2019/0363351 A1 | 11/2019 | Ota et al. |
| 2020/0014025 A1 | 1/2020 | Zagars et al. |

* cited by examiner

CURRENT INTERRUPT DEVICE BASED ON THERMAL ACTIVATION OF FRANGIBLE GLASS BULB

CROSS-REFERENCE TO RELATED APPLICATIONS

The application claims priority to and the benefit of U.S. Provisional Patent Application Ser. No. 62/689,460 entitled, "Current Interrupt Device Based on Thermal Activation of Frangible Glass Bulb," filed Jun. 25, 2018, the disclosure of which is incorporated herein by reference in its entirety.

BACKGROUND

Many electrochemical cells (e.g., lithium ion batteries) are susceptible to damage when subjected to abuse conditions (e.g., overcharge, over-temperature, overvoltage, unwanted or uncontrolled short circuits). Redundant monitoring systems are often required, adding significant complexity and cost to large-scale energy storage systems and limiting their adoption. Current interrupt devices (CIDs) are often used as a safety feature for electrochemical cells to prevent overcharging and/or short-circuiting, which can lead to catastrophic failure of the electrochemical cell. Existing CIDs often use the internal pressure generated within the electrochemical cell as a means to interrupt or disconnect the active cell elements from the electrical current path. This method of current interruption can lead to gas exposure and may result in catastrophic failure for the electrochemical cell.

SUMMARY

Embodiments described herein relate generally to a current interrupt device (CID) including a frangible bulb that is configured to be thermally triggered. In some embodiments, the CID includes a breaking contact electrically coupled to a fixed contact and held in electrical contact by the frangible bulb. In some embodiments, the frangible bulb is configured to break at a temperature threshold. In some embodiments, the breaking contact is configured to bend, rotate and/or otherwise deform about a hinge point in order to become electrically disconnected from the fixed contact when the frangible bulb breaks. In some embodiments, opening the electrical circuit between the breaking contact and the fixed contact may prevent overcharging, overvoltage conditions, overcurrent conditions, thermal runaway, and/or other catastrophic failure events. In some embodiments, the CID can be positioned sufficiently close to an electrochemical cell such that a temperature of the frangible bulb is substantially similar to an operating temperature of the electrochemical cell and such that the frangible bulb breaks when the temperature within the electrochemical cell is substantially similar to the temperature threshold. In some embodiments, the heat is provided by one of the cell terminals, e.g., the cathode tab or the anode tab. In some embodiments, the heat is provided by the cell tabbing. In some embodiments, the CID can include a resistor configured to heat the frangible bulb to above the temperature threshold when the current through the breaking contact reaches a current threshold. In some embodiments, the CID can include a diode and a heating element, the diode configured to keep the heating element disconnected from current below a voltage threshold. In some embodiments, once the voltage reaches or exceeds the voltage threshold, the diode can connect the heating element to the circuit above the voltage threshold, the heating element being configured to heat the frangible bulb to above the temperature threshold.

DETAILED DESCRIPTION

Embodiments described herein relate generally to current interrupt devices (CIDs) configured to be thermally triggered in response to at least one of overcurrent conditions, overvoltage conditions, and thermal runaway. As described herein, the CIDs include a breaking contact electrically coupled to a fixed contact and held in electrical contact thereto by a frangible bulb. In some embodiments, the frangible bulb defines a cavity configured to contain a liquid and a gas. In some embodiments, the liquid and/or the gas contained in the frangible bulb can be selected to expand volumetrically, causing the frangible bulb to break at a temperature threshold. In some embodiments, since the frangible bulb is positioned to hold the breaking contact and the fixed contact in electrical communication, when the frangible bulb breaks the breaking contact can become electrically disconnected from the fixed contact. In some embodiments, at least a portion of the breaking contact can bend, rotate, and/or otherwise deform about a hinge point once the frangible bulb breaks. In some embodiments, opening the electrical circuit between the breaking contact and the fixed contact may prevent overcharging, overvoltage conditions, overcurrent conditions, thermal runaway, and/or other catastrophic failure events.

In electrochemical cell design (e.g., for Li-ion batteries), safety is one of the primary areas of concern. In certain conditions where the cell is overcharged or short circuited, there is a potential for sudden release of stored energy resulting in catastrophic failure (i.e., explosion, fire, flying parts, etc.). Other ways in which electrochemical cells can fail include but are not limited to external short circuit, internal short circuit, dendrite formation, separator failure, impact/puncture short circuit, overcharge, over-discharge, external overheating, self-overheating, cell rupture, fire/explosion due to flammable/explosive gas generation, etc. To prevent catastrophic failure during these conditions it is desirable to interrupt the flow of energy into and out of the cell. This can be accomplished in several ways, including physically disconnecting or breaking the electrical current path into the cell. Typical CIDs used in electrochemical cells are very costly and complex to implement, with suspect reliability.

As used in this specification, the singular forms "a," "an," and "the" include plural referents unless the context clearly dictates otherwise. Thus, for example, the term "a member" is intended to mean a single member or a combination of members, "a material" is intended to mean one or more materials, or a combination thereof.

The term "substantially" when used in connection with "cylindrical," "linear," and/or other geometric relationships is intended to convey that the structure so defined is nominally cylindrical, linear or the like. As one example, a portion of a support member that is described as being "substantially linear" is intended to convey that, although linearity of the portion is desirable, some non-linearity can occur in a "substantially linear" portion. Such non-linearity can result from manufacturing tolerances, or other practical considerations (such as, for example, the pressure or force applied to the support member). Thus, a geometric construction modified by the term "substantially" includes such geometric properties within a tolerance of plus or minus 5% of the stated geometric construction. For example, a "substantially linear" portion is a portion that defines an axis or center line that is within plus or minus 5% of being linear.

As used herein, the term "set" and "plurality" can refer to multiple features or a singular feature with multiple parts. For example, when referring to a set of electrodes, the set of electrodes can be considered as one electrode with multiple portions, or the set of electrodes can be considered as multiple, distinct electrodes. Additionally, for example, when referring to a plurality of electrochemical cells, the plurality of electrochemical cells can be considered as multiple, distinct electrochemical cells or as one electrochemical cell with multiple portions. Thus, a set of portions or a plurality of portions may include multiple portions that are either continuous or discontinuous from each other. A plurality of particles or a plurality of materials can also be fabricated from multiple items that are produced separately and are later joined together (e.g., via mixing, an adhesive, or any suitable method).

As used herein, the term "about" and "approximately" generally mean plus or minus 10% of the value stated, e.g., about 250 µm would include 225 µm to 275 µm, about 1,000 µm would include 900 µm to 1,100 µm.

In some embodiments, a CID can be operably coupled to an electrochemical cell and can include a breaking contact electrically coupled to a fixed contact, a frangible bulb configured to keep the breaking contact coupled to the fixed contact and configured to break at a temperature threshold, and a shutter configured to be interposed between the breaking contact and the fixed contact when the frangible bulb breaks. In some embodiments, the frangible bulb defines a cavity containing at least one of a quantity of a gas and a quantity of a liquid.

In some embodiments, the CID can include a diode configured to not allow current to reach a heating element when the cell voltage is below a voltage threshold and to allow current to reach the heating element at or above the voltage threshold. In other words, the diode can be forward-biased such that the diode is activated only when the cell voltage reaches or exceeds a cut-in voltage in a forward direction. In some embodiments, the heating element can be positioned sufficiently close to the frangible bulb such that when the diode provides current to the heating element, the frangible bulb can heat up and break once the temperature of the liquid inside the frangible bulb reaches the temperature threshold. In some embodiments, the temperature threshold can be greater than about 80° C., greater than about 90° C., greater than about 100° C., greater than about 150° C., or between about 80° C. and about 200° C., inclusive of all values and ranges therebetween.

In some embodiments, the shutter can be spring-loaded such that when the frangible bulb breaks, stored potential energy in the spring applies a force to the shutter, causing the shutter to be interposed between the breaking contact and the fixed contact. In some embodiments, the shutter can include or be made from an electrically insulating material. In some embodiments, interposing the shutter between the breaking contact and the fixed contact can disconnect the electrical contact between the breaking contact and the fixed contact. In some embodiments, electrically disconnecting the breaking contact from the fixed contact can stop electrical current into or out of the electrochemical cell to which the CID is operably coupled.

In some embodiments, the CID can further include a resistor configured to heat the frangible bulb when a current through the breaking contact is greater than or equal to a current threshold. In some embodiments, the fixed or breaking contacts may be configured to heat the frangible bulb via Ohmic heating when a current through the fixed or breaking contact is greater or equal to a current threshold.

In some embodiments, the CID can be positioned sufficiently close to the electrochemical cell such that a temperature of the quantity of the liquid within the frangible bulb is substantially similar to the operating temperature of the electrochemical cell.

In some embodiments, the CIDs described herein can be used to protect an electrochemical cell from at least one of an overvoltage condition, an overcurrent condition, and an over-temperature condition. In some embodiments, the method of use of the CID can include electrically coupling the CID to at least one of an anode tab and a cathode tab. In some embodiments, the method can further include allowing the thermally responsive frangible bulb to break when the liquid expands to fill the closed interior region in response to a change in temperature in excess of the temperature threshold range. In some embodiments, the method can include resetting the CID after an initial thermal activation of the CID by breaking the frangible bulb. In some embodiments, the method can include resetting the shutter into position such that it is not interposed between the breaking contact and the fixed contact, e.g., by loading the spring. In some embodiments, the method can include resetting the breaking contact into electrical contact with the fixed contact. In some embodiments, the method can include positioning an unbroken second frangible bulb into place such that the frangible bulb maintains the electrical contact between the breaking contact and the fixed contact while the electrochemical cell is operating normally.

FIGS. 1, 2, 3A, and 3B illustrate a current interrupt device 100 (CID 100) configured to disconnect electrical current across a cathode tab (not shown) or an anode tab (not shown) to prevent overcharging, short-circuit, overcurrent conditions, overvoltage conditions, and/or thermal runaway of an electrochemical cell (not shown). In some embodiments, the CID 100 can be connected to the cathode tab or the anode tab such that, during normal operation of the electrochemical cell, the CID 100 does not impede the charging or discharging of the electrochemical cell. In some embodiments, the CID 100 can include a breaking contact 102 and a fixed contact 104. In some embodiments, the breaking contact 102 and the fixed contact 104 can include the same materials chosen to be compatible with the electrochemistry of the electrode to which the CID 100 is electrically coupled. In some embodiments, the breaking contact 102 and/or the fixed contact 104 can include but are not limited to copper, aluminum, titanium, any of these materials coated in one of nickel, tin, silver, or gold, other suitable materials, and combinations thereof.

In some embodiments, a frangible bulb 106 can be positioned in such a way as to keep the breaking contact 102 electrically coupled to the fixed contact 104 during normal operation of the CID 100. In some embodiments, the frangible bulb 106 can provide enough contact force between the fixed contact 102 and the breaking contact 104 to maintain a low-resistance contact therebetween. In some embodiments, the frangible bulb 106 can be held in place using a set screw 108. In some embodiments, a leaf spring, plug, wedge, or other mechanism can be used to hold the frangible bulb 106 in place. In some embodiments, an expanding foam, polymer, resin, or other material can be used to hold the frangible bulb 106 in place within the CID 100. In some embodiments, contacting surfaces can be positioned around the frangible bulb 106 such that the frangible bulb 106 is held substantially in place during use of the CID 100. In some embodiments, the frangible bulb can 106 can define a cavity (not shown) configured to contain a liquid and/or a gas. In some embodiments, the liquid and/or the gas can expand and contract volumetrically as the temperature changes. In some embodiments, the liquid and/or the gas can expand volumetrically when the temperature rises above a temperature threshold, breaking the frangible bulb 106.

In some embodiments, the frangible bulb 106 can be substantially columnar, spherical, cylinder, cone, cube, cuboid, hexagonal prism, square-based pyramid, tetrahedron, triangular prism, octagonal prism, ellipsoid, octahedron, dodecahedron, icosahedron, octahedron, polygonal structures, or combinations thereof. In some embodiments, the frangible bulb 106 can have a largest dimension that relates to the length of the frangible bulb 106 and relates substantially to the distance between the set screw 108 and the breaking contact 102 or a contact surface thereupon. In some embodiments, the frangible bulb 106 can have a largest dimension greater than about 0.5 mm, about 1 mm, about 2 mm, about 3 mm, about 4 mm, about 5 mm, about 6 mm, about 7 mm, about 8 mm, about 9 mm, about 10 mm, about 11 mm, about 12 mm, about 13 mm, about 14 mm, about 15 mm, about 16 mm, about 17 mm, about 18 mm, about 19 mm, about 20 mm, about 21 mm, about 22 mm, about 23 mm, about 24 mm, about 25 mm, about 26 mm, about 27 mm, about 28 mm, about 29 mm, about 30 mm, about 31 mm, about 32 mm, about 33 mm, about 34 mm, about 35 mm, about 36 mm, about 37 mm, about 38 mm, about 39 mm, about 40 mm, about 50 mm, about 60 mm, about 70 mm, about 80 mm, about 90 mm, about 100 mm, or greater than about 150 mm, inclusive of all values and ranges therebetween. In some embodiments, the frangible bulb 106 can have a largest dimension less than about 150 mm, about 100 mm, about 90 mm, about 80 mm, about 70 mm, about 60 mm, about 50 mm, about 40 mm, about 39 mm, about 38 mm, about 37 mm, about 36 mm, about 35 mm, about 34 mm, about 33 mm, about 32 mm, about 31 mm, about 30 mm, about 29 mm, about 28 mm, about 27 mm, about 26 mm, about 25 mm, about 24 mm, about 23 mm, about 22 mm, about 21 mm, about 20 mm, about 19 mm, about 18 mm, about 17 mm, about 16 mm, about 15 mm, about 14 mm, about 13 mm, about 12 mm, about 11 mm, about 10 mm, about 9 mm, about 8 mm, about 7 mm, about 6 mm, about 5 mm, about 4 mm, about 3 mm, about 2 mm, less than about 1 mm, or less than about 0.5 mm, inclusive of all values and ranges therebetween. In some embodiments, the frangible bulb 106 can have a largest dimension between about 1 mm and about 150 mm, about 2 mm and about 100 mm, about 3 mm and about 90 mm, about 4 mm and about 80 mm, about 5 mm and about 70 mm, about 6 mm and about 60 mm, about 7 mm and about 50 mm, about 8 mm and about 40 mm, about 9 mm and about 30 mm, about 10 mm and about 25 mm, about 11 mm and about 24 mm, about 12 mm and about 23 mm, about 13 mm and about 22 mm, about 14 mm and about 21 mm, about 15 mm and about 20 mm, about 0.5 mm and about 50 mm, about 0.5 mm and about 45 mm, about 0.5 mm and about 40 mm, about 0.5 mm and about 35 mm, about 0.5 mm and about 30 mm, about 0.5 mm and about 25 mm, about 0.5 mm and about 20 mm, about 0.5 mm and about 15 mm, about 0.5 mm and about 10 mm, about 0.5 mm and about 5 mm, or about 0.5 mm and about 2.5 mm, inclusive of all values and ranges therebetween.

In some embodiments, the frangible bulb 106 can include a glass shell defining an inner cavity, the glass shell having particular strength, thermophysical, shape, and dimensional characteristics such that the glass shell breaks when the liquid expands to exert a precise hydraulic pressure on the glass shell.

In some embodiments, the frangible bulb 106 can be initially filled or partially filled with a liquid, the remaining space being largely a bubble. In some embodiments, the liquid can have a low freezing point, a large co-efficient of (thermal) expansion, slight compressibility, a low specific heat, and/or a reluctance to retain air in solution. In some embodiments, when the frangible bulb 106 is exposed to rising temperature, the liquid can expand and gradually the bubble can decrease in size, the air being forced into solution because of the increasing pressure and in spite of the elevated temperature. In some embodiments, once all of the gas becomes dissolved in the liquid and the liquid expands to fill the frangible bulb 106, the frangible bulb 106 can be configured to break in response to the hydraulic pressure of the expanding liquid. In some embodiments, the glass shell can be engineered to break locally at a particular hydraulic pressure associated with a precise temperature: the temperature threshold. Without wishing to be bound by any particular theory, since the gas is dissolved within the liquid, when the frangible bulb 106 ruptures, a rapid depressurization occurs, rapid effervescence of the gas from the liquid may cause more catastrophic failure of the frangible bulb 106 and complete release of the pressure holding the breaking contact 102 in electrical connection with the fixed contact 104.

In some embodiments, the liquid can be any suitable fluid as described above, including but not limited to glycerine, ethylene glycol, polyethylene glycol, aniline, bromoform, di-iodine methane, mercury, carbon tectrachloride, alcohol, tetrachloroethane, acetone, amyl acetate, triethylene glycol, glycol diacetate, ethylene glycol, glycerol, other dielectric fluids commonly used for heat transfer applications, trichloromethane, tetrachloroethylene, perchloroethylene, the chemical groups consisting of derivatives of aromatic hydrocarbons containing two or more halogen substituents, aliphatic amides, 1,2 Dibromobenzene, 1,3 Dichlorobenzene, 1,3 Dioxolane, 1 Bromo 3 Chlorobenzene, benzene for which two or more hydrogens are substituted by a halogen, 1,3 dibromobenzene, Cyclohexane, Formamide, N,N Dimethylformamide, Propanone (Acetone), Tetrachloroethylene, or combinations thereof.

In some embodiments, the temperature threshold at which the frangible bulb 106 fractures is between about 60° C. and about 200° C., between about 65° C. and about 195° C., between about 70° C. and about 190° C., between about 75° C. and about 185° C., between about 80° C. and about 180° C., between about 85° C. and about 175° C., between about 90° C. and about 170° C., between about 95° C. and about 165° C., between about 100° C. and about 160° C., between about 105° C. and about 155° C., between about 110° C. and about 150° C., between about 115° C. and about 145° C., between about 120° C. and about 140° C., between about 60° C. and about 195° C., between about 60° C. and about 190° C., between about 60° C. and about 185° C., between about 60° C. and about 180° C., between about 60° C. and about 175° C., between about 60° C. and about 170° C., between about 60° C. and about 165° C., between about 60° C. and about 160° C., between about 60° C. and about 155° C., between about 60° C. and about 150° C., between about 60° C. and about 145° C., between about 60° C. and about 140° C., between about 60° C. and about 135° C., between about 60° C. and about 130° C., between about 60° C. and about 125° C., between about 60° C. and about 120° C., between about 60° C. and about 115° C., between about 60° C. and about 110° C., between about 60° C. and about 105° C., between about 60° C. and about 100° C., between about 60° C. and about 95° C., between about 60° C. and about 90° C., between about 60° C. and about 85° C., between about 60° C. and about 80° C., between about 65° C. and about 200° C., between about 70° C. and about 200° C., between about 75° C. and about 200° C., between about 80° C. and about 200° C., between about 85° C. and about 200° C., between about 90° C. and about 200° C., between about 95° C. and about 200° C., between about 100° C. and about 200° C., between about 105° C. and about 200° C., between about 110° C. and about 200° C., between about 115° C. and about 200° C., between about 120° C. and about 200° C., between about 125° C. and about 200° C., between about 130° C. and about 200° C., between about 135° C. and about 200° C., between about 140° C. and about 200° C., between about 145° C. and about 200° C., between about 150° C. and about 200° C., between about 155° C. and about 200° C., between about 160° C. and about 200° C., between about 165° C. and about 200° C., between about 170° C. and about 200° C., between about 175° C. and about 200° C., or between about 180° C. and about 200° C., inclusive of all values and ranges therebetween. In some embodiments, the temperature threshold at which the frangible bulb 106 fractures is greater than about 60° C., about 65° C., about 70° C., about 75° C., about 80° C., about 85° C., about 90° C., about 95° C., about 100° C., about 105° C., about 110° C., about 115° C., about 120° C., about 125° C., about 130° C., about 135° C., about 140° C., about 145° C., about 150° C., about 155° C., about 160° C., about 165° C., about 170° C., about 175° C., about 180° C., about 185° C., about 190° C., about 195° C., or greater than about 200° C., inclusive of all values and ranges therebetween. In some embodiments, the temperature threshold at which the frangible bulb 106 fractures is less than about 200° C., about 195° C., about 190° C., about 185° C., about 180° C., about 175° C., about 170° C., about 165° C., about 160° C., about 155° C., about 150° C., about 145° C., about 140° C., about 135° C., about 130° C., about 125° C., about 120° C., about 115° C., about 110° C., about 105° C., about 100° C., about 95° C., about 90° C., about 85° C., about 80° C., about 75° C., about 70° C., about 65° C., about 60° C., or less than about 50° C., inclusive of all values and ranges therebetween.

In some embodiments, the glass shell of the frangible bulb 106 can be scored or otherwise weakened at a particular location such that fracture initiation can begin at the particular location and escaping liquid and/or gas can be directed away from the breaking contact 102 and fixed contact 104. In some embodiments, escaping liquid and/or gas can be directed towards an absorptive material such that the liquid does not leak into the electrochemical cell.

In some embodiments, the CID 100 can include more than one frangible bulb 106, for example two, three, four, five, six, seven, eight, nine, or ten frangible bulbs 106. In some embodiments, when the CID 100 includes more than one frangible bulb 106, the risk of accidental (unwanted) triggering of the CID 100 and disconnection of the breaking contact 102 from the fixed contact 104 may be lower. In some embodiments, especially when the electrochemical cell is used in more damage-prone applications, the frangible bulb 106 may fracture, e.g., due to sudden movement of the CID 100 or due to impact from moving objects. For instance, in automotive applications where the electrochemical cell is part of a battery pack that may be prone to jostling and vibrations during normal use, including more than one frangible bulb 106 in the CID 100 can reduce the risk of unintended triggering of the CID 100 during normal operation of the electrochemical cell.

In some embodiments, the CID 100 can include a contact pad 110 positioned between the frangible bulb 106 and the breaking contact 102. In some embodiments, the contact pad 110 can be affixed to the breaking contact 102. In some embodiments, the contact pad 110 can be configured to have a contact surface that holds one end of the frangible bulb 106 in place against the contact pad 110. In some embodiments, the contact pad 110 can have a concave portion configured such that a convex portion of the frangible bulb 106 can come to rest in the concave potion of the contact pad 110 when the frangible bulb 106 is positioned within the CID 100. In some embodiments, the contact pad 110 can include an insulating material such as a plastic such that the frangible bulb 106 is insulated from the electrical current being communicated through the breaking contact 102 and into the fixed contact 104.

In some embodiments, when the frangible bulb 106 breaks, a shutter 112 can be allowed to separate the breaking contact 102 from the fixed contact 104 by being physically interposed therebetween. In some embodiments, the shutter 112 can include an electrically insulating material such that when the shutter 112 is interposed between the breaking contact 102 and the fixed contact 104, the breaking contact 102 can become electrically disconnected from the fixed contact 104. In some embodiments, the shutter can include any suitably insulating material, including but not limited to wood, ceramics, plastics, glass, porcelain, clays, minerals, and combinations thereof. In some embodiments, the shutter 112 can be configured to have a thicker portion tapering to a pointed distal portion. In some embodiments, the breaking contact 102 can extend beyond the end of the fixed contact 104. In some embodiments, the shutter 112 can be configured to apply perpendicular force to the portion of the breaking contact 102 that extends beyond the fixed contact 104 in order to electrically disconnect the breaking contact 102 from the fixed contact 104. In some embodiments, the breaking contact 102 can include a contact surface such that the shutter 112 can apply force against the contact surface to electrically disconnect the breaking contact 102 from the fixed contact 104. In some embodiments, the CID 100 can further include a spring 114. In some embodiments, the shutter 112 can be positioned in a first configuration such that the spring 114 is substantially compressed during normal operation of the electrochemical cell. In some embodiments, the shutter 112 can be positioned in a second configuration once the frangible bulb 106 breaks, wherein in the second configuration, the potential energy stored in the spring 114 is released as the spring 114 expands, causing the shutter 112 to electrically disconnect the breaking contact 102 from the fixed contact 104. In some embodiments, the CID 100 can further include a stop 116 configured to define an extent of movement of the shutter 112 after the frangible bulb 106 breaks.

In some embodiments, when the frangible bulb 106 breaks and the shutter 112 is allowed to separate the breaking contact 102 from the fixed contact 104 by being physically interposed therebetween, the breaking contact 102 can move while the fixed contact 102 remains substantially unmoved. In some embodiments, the breaking contact 102 can be moved away from the fixed contact 104 by a deformation of a portion of the breaking contact 102 without movement of the remainder of the breaking contact 102 with respect to the CID 100. In some embodiments, the breaking contact 102 can be moved away from the fixed contact 104 by moving the entire breaking contact 102 with respect to the fixed contact 104 and without deformation of the breaking contact 102. In some embodiments, the breaking contact 102 can be moved away from the fixed contact 104 by moving the entire breaking contact 102 with respect to the fixed contact 104 and by also deforming a portion of the breaking contact 102. In some embodiments, deformation of a portion of the breaking contact 102 can be accomplished by allowing the shutter 112 to displace the breaking contact 102 and for the breaking contact 102 to deform in a substantially uncontrolled manner. In some embodiments, the breaking contact 102 can include material or materials that are suitably deformable at the temperature at which the frangible bulb 106 breaks such that deformation is less likely during normal operation of the electrochemical cell but easier under the conditions in which the CID 100 is engaged. In some embodiments, the breaking contact 102 can include a thinned portion such that when the shutter 112 is interposed between the breaking contact 102 and the fixed contact 104, the breaking contact 102 is engineered to deform by a first portion rotating about the thinned portion while a second portion remains substantially intact. In some embodiments, the breaking contact 102 can be scored, etched, compressed, or otherwise manipulated to achieve the thinned portion.

In some embodiments, the CID 100 can include an enclosure 124 configured to contain the components of the CID 100. In some embodiments, the enclosure 124 can include a first aperture by which the breaking contact 102 passes from the anode tab or cathode to and into the enclosure 124, a second aperture by which the fixed contact 104 passes from inside the enclosure 124 back out to the anode tab or cathode tab, and a third aperture by which the frangible bulb is positioned within the enclosure 124. In some embodiments, the first and second apertures can be substantially filled by the breaking contact 102 and the fixed contact 104, respectively. In some embodiments, the third aperture can be sealed closed after the frangible bulb 106 is positioned within the enclosure 124 by the placement and rotational fixture of the set screw 108 within the third aperture.

In some embodiments, the CID 100 can be resettable. In other words, in some embodiments, once the frangible bulb 106 breaks and the shutter 112 is interposed between the breaking contact 102 and the fixed contact 104 to discontinue electrical current into or out of the electrochemical cell, portions of the CID 100 can be reset and components replaced to return it to the original condition. For instance, in some embodiments, the shutter 112 can be moved back into position in the first configuration (re-loading the spring 114), the breaking contact 102 can be repositioned into electrical communication with the fixed contact 104, and the frangible bulb 106 can be replaced to reset the CID 100. In some embodiments, the frangible bulb 106 can be replaced by removing the set screw 108, inserting a new frangible bulb 106 through the third aperture and replacing the set screw 108 to secure the frangible bulb 106 in place.

In some embodiments, the CID 100 can further include a resistor 118 having a designed resistance to the passage of an electric current. In some embodiments, the resistor 118 can be a heat conductor designed to heat the frangible bulb 106 during overcurrent conditions. In some embodiments, the resistor 118 can be configured to convert current from the breaking contact 102 to thermal energy via resistive heating. In some embodiments, the breaking contact 102 may be configured to directly convert current to thermal energy via Ohmic heating. In some embodiments, the overcurrent condition can include a C-rate during discharge of between about C/10 and about 200 C, between about C/10 and about 190 C, between about C/10 and about 180 C, between about C/10 and about 170 C, between about C/10 and about 160 C, between about C/10 and about 150 C, between about C/10 and about 140 C, between about C/10 and about 130 C, between about C/10 and about 120 C, between about C/10 and about 110 C, between about C/10 and about 100 C, between about C/10 and about 90 C, between about C/10 and about 80 C, between about C/10 and about 70 C, between about C/10 and about 60 C, between about C/10 and about 50 C, between about C/10 and about 40 C, between about C/10 and about 30 C, between about C/10 and about 20 C, between about C/9 and about 19 C, between about C/8 and about 18 C, between about C/7 and about 17 C, between about C/6 and about 16 C, between about C/5 and about 15 C, between about C/4 and about 14 C, between about C/3 and about 13 C, between about C/2 and about 12 C, between about C/1 and about 11 C, between about 1 C and about 10 C, between about 2 C and about 9 C, between about 3 C and about 8 C, between about C/10 and about 19 C, between about C/10 and about 18 C, between about C/10 and about 17 C, between about C/10 and about 16 C, between about C/10 and about 15 C, between about C/10 and about 14 C, between about C/10 and about 13 C, between about C/10 and about 12 C, between about C/10 and about 11 C, between about C/10 and about 10 C, between about C/10 and about 9 C, between about C/10 and about 8 C, between about C/10 and about 7 C, between about C/10 and about 6 C, between about C/10 and about 5 C, between about C/10 and about 4 C, between about C/10 and about 3 C, between about C/10 and about 2 C, between about C/10 and about 1 C, between about C/10 and about C/1, between about C/10 and about C/2, between about C/10 and about C/3, between about C/10 and about C/4, between about C/10 and about C/5, between about C/10 and about C/6, between about C/10 and about C/7, between about C/10 and about C/8, between about C/10 and about C/9, between about C/9 and about 200 C, between about C/8 and about 200 C, between about C/7 and about 200 C, between about C/6 and about 200 C, between about C/5 and about 200 C, between about C/4 and about 200 C, between about C/3 and about 200 C, between about C/2 and about 200 C, between about 1C and about 200 C, between about 2 C and about 200 C, between about 3 C and about 200 C, between about 4 C and about 200 C, between about 5 C and about 20 0C, between about 6 C and about 200 C, between about 7 C and about 200 C, between about 8 C and about 200 C, between about 9 C and about 200 C, between about 10 C and about 200 C, between about 11 C and about 200 C, between about 12 C and about 200 C, between about 13 C and about 200 C, between about 14 C and about 200 C, between about 15 C and about 200 C, between about 16 C and about 200 C, between about 17 C and about 200 C, between about 18 C and about 200 C, between about 19 C and about 200 C, between about 20 C and about 200 C, between about 30 C and about 200 C, between about 40 C and about 200 C, between about 50 C and about 200 C, between about 60 C and about 200 C, between about 70 C and about 200 C, between about 80 C and about 200 C, between about 90 C and about 200 C, between about 100 C and about 200 C, between about 110 C and about 200 C, between about 120 C and about 200 C, between about 130 C and about 200 C, between about 140 C and about 200 C, between about 150 C and about 200 C, between about 160 C and about 200 C, between about 170 C and about 200 C, between about 180 C and about 200 C, or between about 190 C and about 200 C, inclusive of all values and ranges therebetween. In some embodiments, the overcurrent condition can include a C-rate during discharge of greater than about C/50, C/40, C/30, C/20, C/10, C/9, C/8, C/7, C/6, C/5, C/4, C/3, C/2, 1 C, 2 C, 3 C, 4 C, 5 C, 6 C, 7 C, 8 C, 9 C, 10 C, 11 C, 12 C, 13 C, 14 C, 15 C, 16 C, 17 C, 18 C, 19 C, 20 C, 30 C, 40 C, 50 C, 60 C, 70 C, 80 C, 90 C, 100 C, 110 C, 120 C, 130 C, 140 C, 150 C, 160 C, 170 C, 180 C, 190 C, or 200 C, inclusive of all values and ranges therebetween.

In some embodiments, the resistor 118 can include a conductor (not shown) configured to heat up when the current exceeds a current threshold. In some embodiments, the resistor 118 can itself heat up when the current exceeds the current threshold. In some embodiments, the resistor 118 can include but are not limited to carbon-containing materials, metals, metal oxides, or other partially conductive materials that heat up when electrical current is caused to flow into the resistor 118.

In some embodiments, the CID 100 can include a diode 120 configured to resist conduction of electrical current to a heating element 122 when the cell voltage is below a voltage threshold. In some embodiments, the diode 120 can be configured to conduct current from the breaking contact 102 to the heating element 122 when the cell voltage reaches or exceeds the voltage threshold. In some embodiments, the heating element 122 can convert current coming into the diode 120 or from the diode 120 to thermal energy via resistive heating, similar to the way in which the resistor 118 operates. In some embodiments, the heating element 122 can be positioned sufficiently close to the frangible bulb 106 such that when the heating element 122 heats up to above the temperature threshold, the frangible bulb 106 also heats to above the temperature threshold and breaks. In some embodiments, the diode 120 can also act as a heat generator due to inherent resistance. In some embodiments, the diode 120 can be positioned sufficiently close to the frangible bulb 106 such that when the diode 120 heats to above the temperature threshold, the frangible bulb 106 also heats to above the temperature threshold and breaks. In some embodiments, both the diode 120 and the heating element 122 can be positioned sufficiently close to the frangible bulb 106 such that as both the diode 120 and the heating element 122 heat up, the combination of thermal energy produced by both the diode 120 and the heating element 122 can cause the frangible bulb 106 to heat up and break. In some embodiments, the heating rate of the diode 120 and/or the heating element 122 at various voltages may be tailored by adjusting the resistance of the heating element 122. In some embodiments, the heating element 122 can include a length of copper wire or a resistor, e.g., similar to the resistor 118. In some embodiments, the voltage threshold value can be tailored by adjusting the type and quantity of diodes 120 in the CID 100. In some embodiments, the number of diodes 120 can be one, two, three, four, five, six, seven, eight, nine, ten, greater than ten, or between one and three, inclusive of all values and ranges therebetween. In some embodiments, including more than one diode 120 may lead to a reduction in the risk that at least one of the diodes 120 will initiate heating of the frangible bulb 106 when the voltage reaches or exceeds the voltage threshold.

In some embodiments, the voltage threshold can be greater than about 1.0 V, about 1.1 V, about 1.2 V, about 1.3 V, about 1.4 V, about 1.5 V, about 1.6 V, about 1.7 V, about 1.8 V, about 1.9 V, about 2.0 V, about 2.1 V, about 2.2 V, about 2.3 V, about 2.4 V, about 2.5 V, about 2.6 V, about 2.7 V, about 2.8 V, about 2.9 V, about 3.0 V, about 3.1 V, about 3.2 V, about 3.3 V, about 3.4 V, about 3.5 V, about 3.6 V, about 3.7 V, about 3.8 V, about 3.9 V, about 4.0 V, about 4.1 V, about 4.2 V, about 4.3 V, about 4.4 V, about 4.5 V, about 4.6 V, about 4.7 V, about 4.8 V, about 4.9 V, about 5.0 V, about 5.1 V, about 5.2 V, about 5.3 V, about 5.4 V, about 5.5 V, about 5.6 V, about 5.7 V, about 5.8 V, about 5.9 V, about 6.0 V, about 6.5 V, about 7.0 V, or greater than about 7.5 V, inclusive of all values and ranges therebetween. In some embodiments, the voltage threshold can be less than about 10 V, about 9.5 V, about 9.0 V, about 8.5 V, about 8.0 V, about 7.5 V, about 7.0 V, about 6.5 V, about 6.0 V, about 5.5 V, about 5.0 V, about 4.9 V, about 4.8 V, about 4.7 V, about 4.6 V, about 4.5 V, about 4.4 V, about 4.3 V, about 4.2 V, about 4.1 V, about 4.0 V, about 3.9 V, about 3.8 V, about 3.7 V, about 3.6 V, about 3.5 V, about 3.4 V, about 3.3 V, about 3.2 V, about 3.1 V, about 3.0 V, about 2.9 V, about 2.8 V, about 2.7 V, about 2.6 V, about 2.5 V, about 2.4 V, about 2.3 V, about 2.2 V, about 2.1 V, about 2.0 V, about 1.9 V, about 1.8 V, about 1.7 V, about 1.6 V, about 1.5 V, or less than about 1.0 V, inclusive of all values and ranges therebetween. In some embodiments, the voltage threshold can be between about 1.0 V and about 10 V, between about 1.5 V and about 9.5 V, about 2.0 V and about 9.0 V, between about 2.5 V and about 8.5 V, between about 3.0 V and about 8.0 V, between about 3.5 V and about 7.5 V, between about 4.0 V and about 7.0 V, between about 4.5 V and about 6.5 V, between about 5 V and about 6 V, or between about 4 V and about 6.0 V, inclusive of all values and ranges therebetween.

In some embodiments, the CID 100 can be positioned sufficiently close to the electrochemical cell to which it is electrically coupled. In some embodiments, the CID 100 can be positioned suitably close to the electrochemical cell such that a temperature of the frangible bulb 106 is substantially similar to an operating temperature of the electrochemical cell. In other words, the CID 100 can be positioned sufficiently close to the electrochemical cell such that the frangible bulb 106 breaks when the temperature within the electrochemical cell is substantially similar to the temperature threshold of the frangible bulb 106. In some embodiments, the frangible bulb is place sufficiently close to a cell terminal that the frangible bulb 106 breaks when the temperature of the terminal is substantially similar to the temperature threshold of the frangible bulb 106. In some embodiments, this terminal is internal to the cell. In some embodiments, this terminal is external to the cell. In some embodiments, the temperature threshold can be a temperature range. In some embodiments, the enclosure 124 can include a pass-through (not shown) whereby thermal energy from the electrochemical cell can more readily equalize the temperature between the electrochemical cell and the CID 100. In some embodiments, a thermally conductive element can pass through the enclosure 124 and be configured to thermally couple the CID 100 to the electrochemical cell such that the CID 100 can experience substantially the same temperature changes experienced by the electrochemical cell. In some embodiments, for example in applications with high ambient temperatures outside of the electrochemical cell and/or CID 100, the enclosure 124 can be thermally insulated on most or many sides and thermally conductive on at least one side adjacent to the electrochemical cell. In this way, the enclosure 124 may make the CID 100 relatively immune to temperature fluctuations not related to the electrochemical cell while being responsive to temperature fluctuations that are related to the electrochemical cell.

In some embodiments, the CID 100 can prevent unwanted and/or uncontrolled short circuit of the electrochemical cell. In some embodiments, at high currents (e.g. during short circuit events), the breaking contact 102 may begin to self-heat via ohmic heating. As it is in close proximity with the frangible bulb 106, the frangible bulb 106 is also heated. When the threshold temperature is reached, the frangible bulb 106 activates and shatters. The shutter 112 then activates, separating the breaking contact 102 from the fixed contact 104 and interrupting further current flow coming from or going into the electrochemical cell.

In some embodiments, the resistor 118 can be positioned and configured to hold the frangible bulb 106 in place during normal operation of the electrochemical cell, e.g., before the frangible bulb 106 breaks. In some embodiments, the resistor 118 can create or partially create a channel occupied by the frangible bulb 106 and which disallows unwanted movement of the frangible bulb 106, which could lead to unintended disconnection of the breaking contact 102 from the fixed contact 104. In some embodiments, the heating element 122 or the breaking contact 102 can also or alternatively create or partially create the channel occupied by the frangible bulb 106 and which disallows unwanted movement of the frangible bulb 106.

In some embodiments, during assembly of the CID 100, the shutter 112 can be positioned out of the way of the breaking contact 102 and fixed contact 104. In some embodiments, the shutter 112 can include a tensioning ribbon (not shown) connected to a non-tapered portion of the shutter 112, the tensioning ribbon extending through the enclosure 124. In some embodiments, the tensioning ribbon can be retracted further from the enclosure 124 to apply compressive force against the spring 114 and to position the shutter 112 appropriately to accommodate the frangible bulb 106. In some embodiments, the frangible bulb 106 can then be inserted through a cavity in the enclosure 124 and into the channel formed by at least one of the resistor 118 and the heating element 122 and the set screw 108 can be wound into place in the cavity to hold the frangible bulb 106 in place. In some embodiments, the tensioning ribbon can then be released to allow the shutter 112 to be properly positioned such that when the frangible bulb 106 breaks, the tensioned spring 114 can cause the shutter 112 to electrically disconnect the breaking contact 102 from the fixed contact 104.

While CID 100 is shown in FIGS. 1, 2, 3A, and 3B as including the resistor 118, the diode 120, the heating element 122, the set screw 108, and the contact pad 116, the CID 100 could also be formed and used that does not use at least one of these elements. In some embodiments, the CID 100 could include the breaking contact 102 and the fixed contact 104 held in electrical contact by the frangible bulb 106. In some embodiments, the frangible bulb 106 can be configured to break at the temperature threshold and release a shutter 112. In some embodiments, the shutter can be configured to be interposed by the release of a coiled spring, e.g., spring 114, between the breaking contact 102 and the fixed contact 104. In some embodiments, the interposed shutter 112 can stop or substantially stop the charging or discharging of the electrochemical cell to which the CID 100 is operably coupled. In some embodiments, the CID 100 can be positioned sufficiently nearby the electrochemical cell such that the temperature of the liquid within the frangible bulb 106 is substantially similar to the operating temperature of the electrochemical cell. In that way, in the event that the electrochemical cell experiences thermal runaway or another over-temperature condition, the frangible bulb 106 can break, initiating the CID 100 to disconnect electrical current between the breaking contact 102 and the fixed contact 104. In some embodiments, the CID 100 can include one of the resistor 118 and the diode 120 plus the heating element 122. In some embodiments, the CID 100 can include the resistor 118 such that the CID 100 is capable of protecting against over-temperature conditions and over-current conditions. In some embodiments, the CID 100 can include the diode 120 and the heating element 122 such that the CID 100 is capable of protecting against over-temperature conditions and over-voltage conditions.

In some embodiments, more than one CID, e.g., CID 100, can be operably coupled to the electrochemical cell. In some embodiments, a first CID can be electrically coupled to the anode tab and a second CID can be electrically coupled to the cathode tab. In this way, the electrochemical cell can be protected from faulty battery operation and failure conditions during both charging and discharging with some redundancy due to the presence of the second CID. In some embodiments, more than one CID can be operably coupled to one of the anode tab and the cathode tab. In some embodiments, one of the CIDs can be electrically coupled nearby the electrochemical cell and can be configured to disconnect electrical current due to a high and precise temperature threshold while not being configured to disconnect electrical current due to the current threshold or the voltage threshold. In some embodiments, one CID can be operably coupled further from the electrochemical cell and can be configured to disconnect electrical current in response to one or both of a current threshold and the voltage threshold. In other words, in some embodiments, a first CID can include a frangible bulb (e.g., frangible bulb 106) configured to break at a precise temperature and can be sufficiently close to the electrochemical cell such as to minimize the delay between when the electrochemical cell reaches the temperature threshold and when the frangible bulb breaks. In addition, in some embodiments, the other CID can be positioned further away from the electrochemical cell and can include a frangible bulb configured to break at a lower temperature threshold than the frangible bulb of the closer positioned CID. In some embodiments, the further positioned CID can be more immune to the fluctuations in operating temperature of the electrochemical cell while requiring a more slight change in temperature due to over-current or over-voltage conditions to break the frangible bulb in the second CID.

In some embodiments, the CID 100 can operate by disconnecting electrical connection between the breaking contact 102 and the fixed contact 104 due to at least one of over-temperature conditions, overcurrent conditions, overvoltage conditions, short-circuit conditions, overcharging, physical damage to the CID 100, or thermal runaway of the electrochemical cell. In some embodiments, the CID 100 can be activated when only one of these conditions exist. For instance, in some embodiments, the CID 100 might be activated if the electrochemical cell is simply overcharged but is otherwise operating properly during discharge. In some embodiments, the CID 100 might be activated if the electrochemical cell experiences a build-up of gas due to the electrochemical reactions occurring in the cell and if the gas causes damage to the CID 100 during a gas-related cell failure event. In some embodiments, heat from the anode reaction may increase the operating temperature of the electrochemical cell, which may cause the breakdown of the organic solvents used as the electrolyte, releasing flammable hydrocarbon gases and building up pressure in the cell. In some embodiments, the flammable hydrocarbon gases can ignite, causing a small fire and damaging the cell but not causing catastrophic failure. In some embodiments, the CID 100 can be activated in such instances to discontinue charging or discharging of the electrochemical cell so that further anode reaction does not occur, discontinuing further gas build-up in the cell. In each of these and many other battery failure conditions, the CID 100 described herein can be activated and current safely disconnected across the cathode tab and/or the anode tab.

Figure 1:
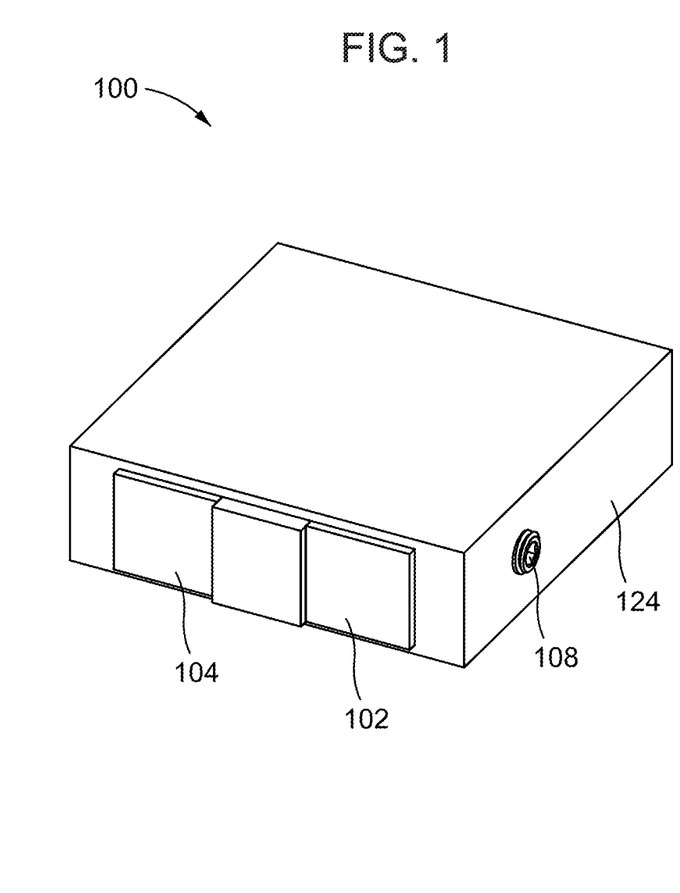
FIG. 1 illustrates a current interrupt device, according to some embodiments.
Figure 2:
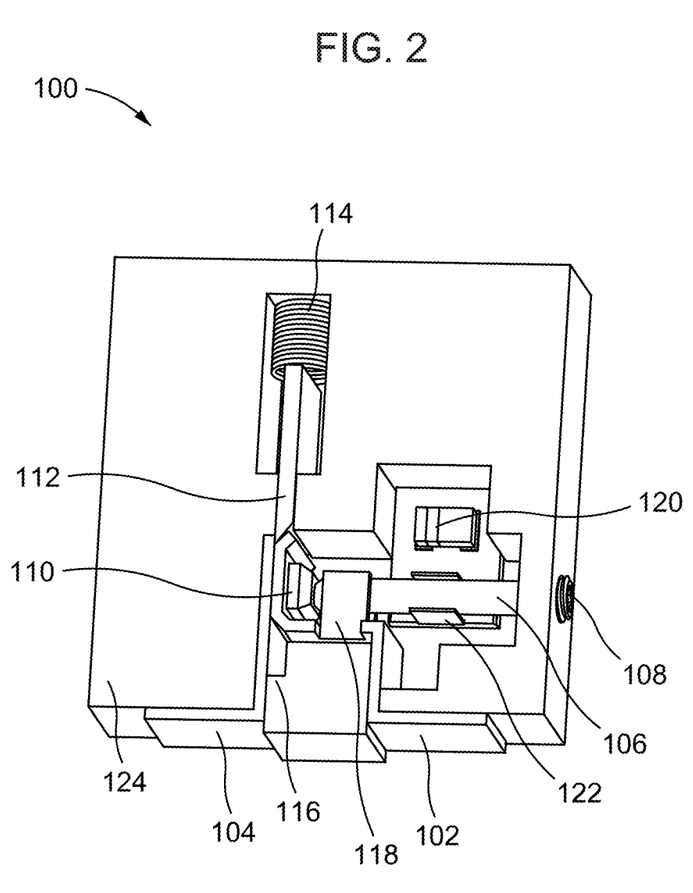
FIG. 2 illustrates an interior view of a current interrupt device, according to an embodiment.
Figure 3A:
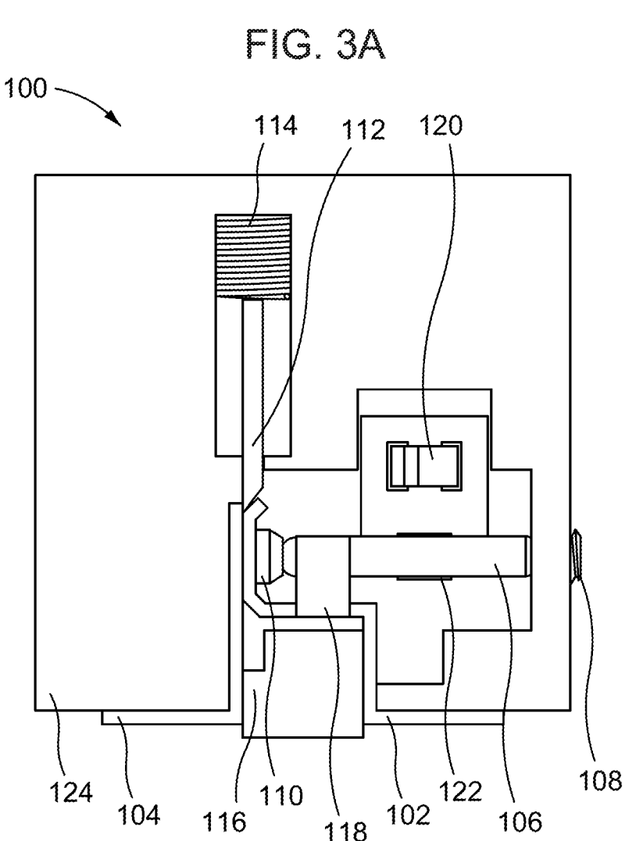
FIG. 3A illustrates a current interrupt device in a first configuration, according to an embodiment.
Figure 3B:
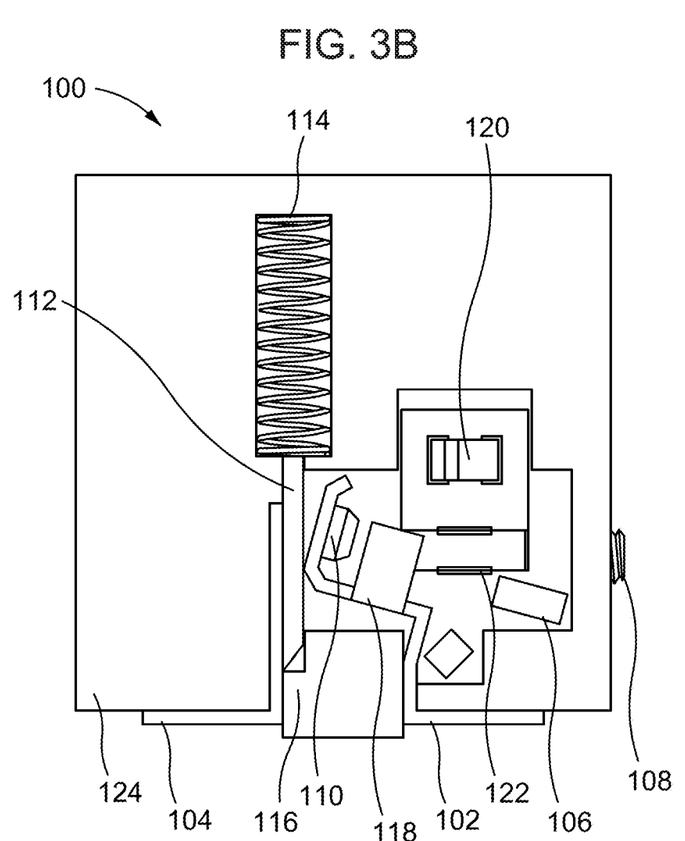
FIG. 3B illustrates the current interrupt device of FIG. 3A in a second configuration.
Figure 4:
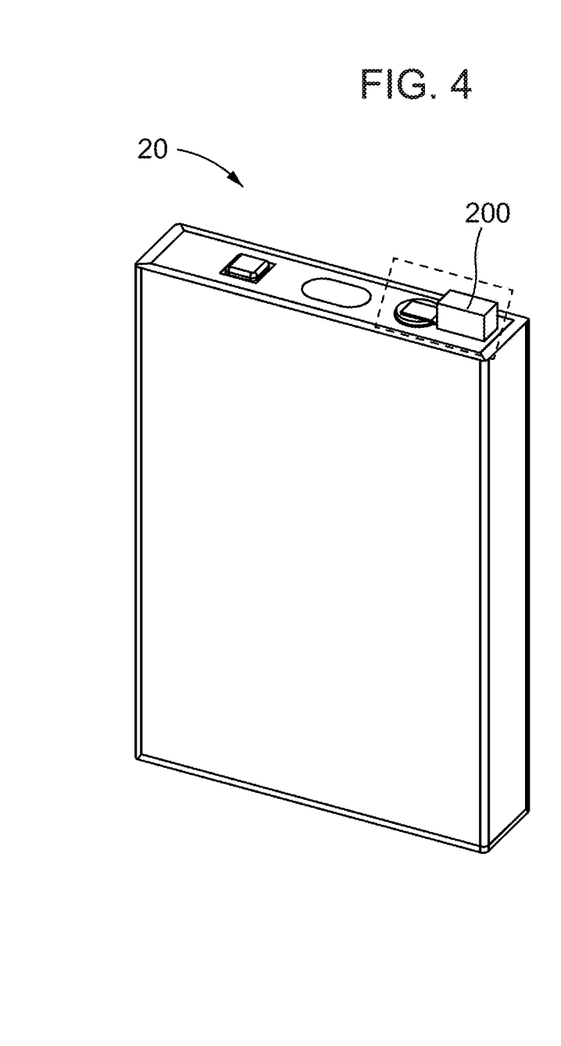
FIG. 4 illustrates an electrochemical cell including a current interrupt device, according to an embodiment.
Figure 5:
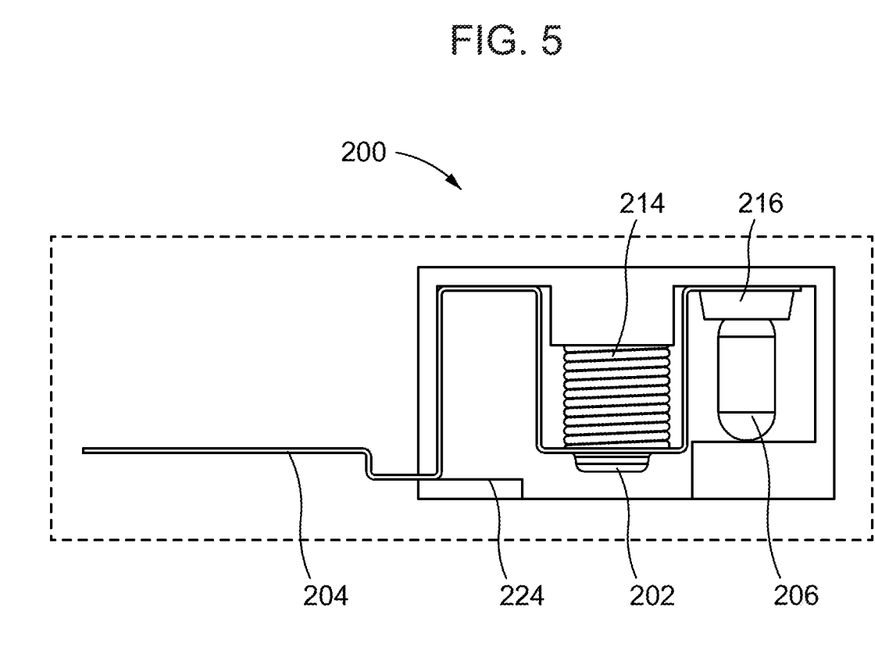
FIG. 5 illustrates a side view of a current interrupt device, according to an embodiment.

FIGS. 4 and 5 show an electrochemical cell 20 including a current interrupt device 200 (CID 200) positioned and configured to create a soft short circuit or a hard short circuit during at least one of an over-current condition, an over-voltage condition, and an over-temperature condition within the electrochemical cell 20. In some embodiments, a high short magnitude may be helpful in order to shunt the overcharge current during failure of the electrochemical cell 20. In some embodiments, the CID 200 can be operably and/or electrically coupled to one of a cathode tab or an anode tab. The CID 200 includes a shorting contact 202 and a fixed contact 204, the shorting contact 202 configured to remain electrically disconnected from the charging or discharging current during normal operation of the electrochemical cell 20. In some embodiments, as shown in FIG. 5, the shorting contact 202 can be positioned such that a spring 214 is loaded and a frangible bulb 206 is positioned such that the spring 214 remains loaded. The frangible bulb 206 can be substantially similar to the frangible bulb 106 described above and is therefore not described in further detail here. In some embodiments, the frangible bulb 206 can include a liquid and/or a gas that expands due to increased temperatures such that the frangible bulb 206 is configured to break at or above a particular temperature threshold.

In some embodiments, the shorting contact 202 can be coupled to a moving end of the spring 214 and a fixed end of the spring 214 can be coupled to an enclosure 224. In some embodiments, the fixed contact 204, the spring 216, and the shorting contact 202 can each be electrically conducting. In some embodiments, when the frangible bulb 206 breaks, the spring 214 is unloaded, the moving end of the spring 214 moves the shorting contact 202 into electrical connection with a conductive material, and the charging or discharging current is diverted through the soft short circuit or hard short circuit.

In some embodiments, the CID 200 can include a contact pad 216, the contact pad 216 including an electrically insulating material and positioned between the frangible bulb 206 and the distal end of the fixed contact 204. In some embodiments, the contact pad 216 may protect the frangible bulb 206 from electrical current-related and/or vibratory failure.

In some embodiments, when the frangible bulb 206 breaks, the shorting contact 202 can be forced into electrical contact with the battery enclosure, casing, a terminal, an extension pad connected to a terminal, or any other suitable material such that the current through the cathode tab or the anode tab is diverted through the soft short circuit or hard short circuit.

In some embodiments, the CID 200 can be configured to interrupt current to or from the electrochemical cell 20 by creating a soft short circuit or a hard short circuit that can be reversed to return the electrochemical cell 20 to normal operation. In other words, after the CID 200 is activated and electrochemical activity within the electrochemical cell 20 is terminated to protect against catastrophic failure events, the CID 200 can be reset and the electrochemical cell 20 can be returned to normal operation. In some embodiments, the CID 200 can be reset by reloading the spring 214 and positioning a replacement frangible bulb 206 into place within the CID 200. In some embodiments, as soon as the shorting contact 202 is moved back into place, the current can return to being communicated through the anode tab or the cathode tab.

In some embodiments, the CID 200 can operate by causing a soft short circuit or a hard short circuit to occur due to at least one of over-temperature conditions, overcurrent conditions, overvoltage conditions, short-circuit conditions, overcharging, physical damage to the CID 200, or thermal runaway of the electrochemical cell 20. In some embodiments, the CID 200 can be activated when only one of these conditions exist. For instance, in some embodiments, the CID 200 might be activated if the electrochemical cell is simply overcharged but is otherwise operating properly during discharge. In some embodiments, the CID 200 might be activated if the electrochemical cell experiences a build-up of gas due to the electrochemical reactions occurring in the cell and if the gas causes damage to the CID 200 during a gas-related cell failure event. In some embodiments, the CID 200 might be activated if a solvent electrolyte from one electrode of the electrochemical cell leaks across a separator to the other electrode and causes the electrochemical cell to discharge the other electrode or current collector thereof. In some embodiments, heat from the anode reaction may increase the operating temperature of the electrochemical cell, which may cause the breakdown of the organic solvents used as the electrolyte, releasing flammable hydrocarbon gases and building up pressure in the cell. In some embodiments, the flammable hydrocarbon gases can ignite, causing a small fire and damaging the cell but not causing catastrophic failure. In some embodiments, the CID 200 can be activated in such instances to discontinue charging or discharging of the electrochemical cell so that further anode reaction does not occur, discontinuing further gas build-up in the cell. In each of these and many other battery failure conditions, the CID 200 described herein can be activated and current safely disconnected across the cathode tab and/or the anode tab. Without wishing to be bound by any particular theory, the formation of a soft to hard short circuit due to the activation of the CID 200 may allow the electrochemical cell 20 to be discharged in a more controlled manner, putting the electrochemical cell 20 into a safer, lower-energy state.

In some embodiments, the heating of the frangible bulb 206 can be controlled by engineering a precise resistance to current at some point in the CID 200. In some embodiments, current resistance can be controlled by contact geometry, material, and/or an in-line resistor. In some embodiments, the CID 200 can include a diode (e.g., diode 120), a heating element (e.g., heating element 122), and/or a resistor (e.g., 118).

Figure 6:
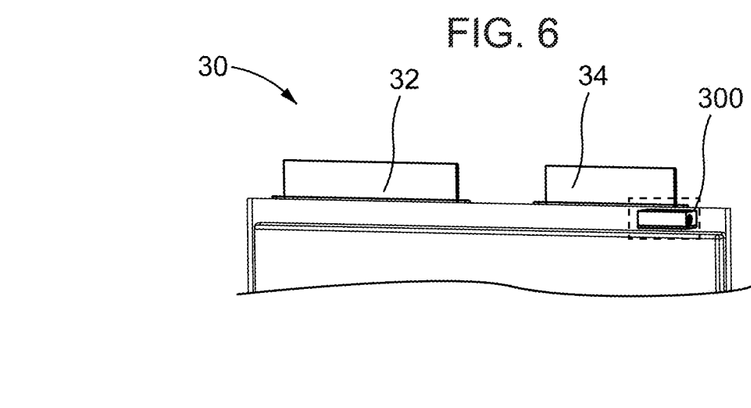
FIG. 6 illustrates a top portion of an electrochemical cell including a current interrupt device, according to an embodiment.
Figure 7:
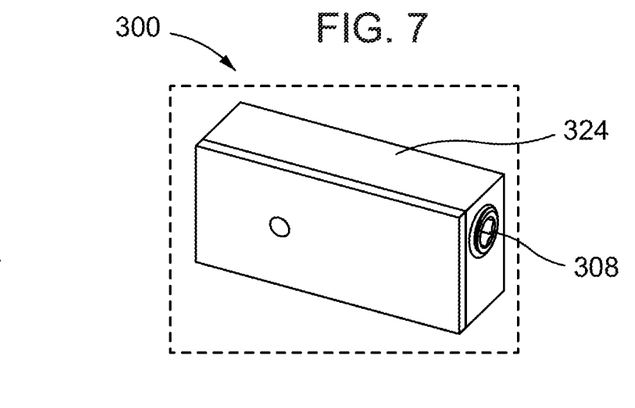
FIG. 7 illustrates a current interrupt device, according to an embodiment.
Figure 8:
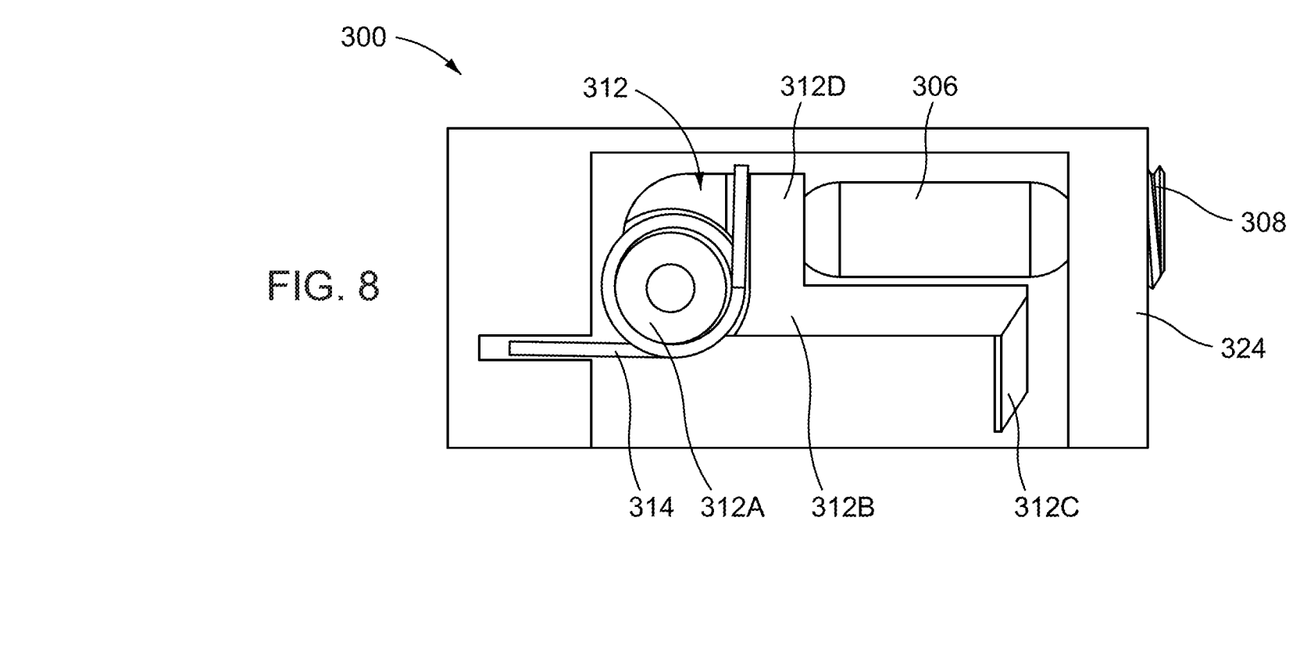
FIG. 8 illustrates an interior view of a current interrupt device, according to an embodiment.

FIGS. 6-8 show an electrochemical cell 30 including a cathode tab 32, an anode tab 34, and a current interrupt device 300 (CID 300), the CID 300 configured to protect the electrochemical cell 30 from least one of an over-current condition, an over-voltage condition, and an over-temperature condition within the electrochemical cell 30. In some embodiments, the electrochemical cell 30 can have any suitable form factor, including but not limited to, a pouch cell, a can, a stacked pouch cell, etc. In some embodiments, the CID 300 can be configured to puncture an enclosure material of the electrochemical cell 30 due to thermal activation of the CID 300 to prevent failure of the electrochemical cell 30. In some embodiments, the CID 300 can be positioned nearby one or both of the cathode tab and the anode tab.

In some embodiments, the CID 300 can include, as shown in FIG. 8, a spring 314 at least partially in tension during normal operation of the electrochemical cell 30. In some embodiments, the spring can have any suitable form factor, including but not limited to a spring, a leaf spring, a torsion spring, axial spring, etc. The CID 300 also includes a shutter 312 configured to puncture the enclosure material of the electrochemical cell when the CID 300 is activated. In some embodiments, the shutter 312 can include a shutter base 312A, a shutter arm 312B coupled to the shutter base 312A and extending a distance from the shutter base 312A, and a shutter blade 312C coupled to the shutter arm 312B. In some embodiments, the spring 314 can be configured to be coupled to, positioned interlinkingly about, or can comprise the shutter base 312A. In some embodiments, the shutter base 312A can be dimensioned and configured to receive force supplied by the spring 314 upon activation of the CID 300. In some embodiments, the force supplied by the spring 314 can include but is not limited to rotational force, restoring force caused by a loaded spring returning to its lowest energy state, or another suitable force. When force is supplied by the spring 314 to the shutter 312, the shutter base 312A rotates about an axis, rotating the shutter arm 312B, and moving the shutter blade 312C, causing the shutter blade 312C to puncture the enclosure material of the electrochemical cell. In some embodiments, when the enclosure material of the electrochemical cell 30 is punctured, the gas or gases formed during the over-current, over-voltage, and/or over-temperature condition within the electrochemical cell 30 are allowed to escape, reducing the risk of catastrophic failure of the electrochemical cell 30.

As shown in FIG. 8, the CID 300 includes a frangible bulb 306 configured to break at a temperature threshold. The frangible bulb 306 can be substantially similar to the frangible bulb 106 described above and is therefore not described in further detail here. In some embodiments, the frangible bulb 306 can include a liquid and/or a gas that expands due to increased temperatures such that the frangible bulb 306 is configured to break at or above a particular temperature threshold. In some embodiments, the frangible bulb 206 can be positioned within an enclosure 324 of the CID 300 such that rotational motion of the shutter 312 is substantially disallowed. In some embodiments, the shutter 312 can include a contact surface 312D, as shown in FIG. 8, against which the frangible bulb 306 can be positioned such that the shutter 312 is unable to rotate due to the force supplied by the spring 314. In other words, in some embodiments, the position of the frangible bulb 306 ensures that the shutter blade 312C is unable to puncture the enclosure material of the electrochemical cell 30 before the frangible bulb 306 breaks.

In some embodiments, the shutter base 312A, shutter arm 312B, shutter blade 312C, and/or shutter contact surface 312D can include or be formed from the same material. In some embodiments, the shutter blade 312C can include a material that is sufficiently durable such that when the shutter blade 312C is rotatably moved into contact with the enclosure material of the electrochemical cell 30, the shutter blade 312C is able to puncture the enclosure material. In some embodiments, the shutter blade 312C is configured to include a sharp point, sharp edge, and/or a needle. In some embodiments, the shutter blade 312C can include a metal material, a polymer material, a plastic material, a mineral material, a ceramic material, or combinations thereof.

In some embodiments, the frangible bulb 306 can be positioned in the CID 300 by inserting the frangible bulb 306 through an aperture (not shown) in the CID 300 and can be removably sealed into place by inserting a set screw 308 into the aperture. In some embodiments, the frangible bulb 306 can be positioned within the CID 300 before the CID 300 is coupled to the electrochemical cell 30. In some embodiments, the CID 300 can be coupled to the electrochemical cell 30 and the frangible bulb 306 can subsequently be positioned within the CID 300. In some embodiments, the CID 300 can include a tensioning ribbon (not shown) connected to one of the shutter base 312A, shutter arm 312B, or the shutter contact surface 312D and extending through the enclosure 324 of the CID 300. In some embodiments, when setting the CID 300, the shutter 312 and the spring 314 can be positioned to accommodate the frangible bulb 306 by pulling on the tensioning ribbon, inserting the frangible bulb 306 through the aperture in the CID 300, and inserting the set screw 308 into the aperture to seal the frangible bulb 306 in place.

In some embodiments, current resistance can be controlled by contact geometry, material, and/or an in-line resistor. In some embodiments, the CID 300 can include a diode (e.g., diode 120), a heating element (e.g., heating element 122), and/or a resistor (e.g., 118).

In some embodiments, the CID 300 can operate by causing the release of gas built up in the electrochemical cell 30 due to at least one of over-temperature conditions, overcurrent conditions, overvoltage conditions, short-circuit conditions, overcharging, physical damage to the CID 300, or thermal runaway of the electrochemical cell. In some embodiments, the CID 300 can be activated when only one of these conditions exist. For instance, in some embodiments, the CID 300 might be activated if the electrochemical cell is simply overcharged but is otherwise operating properly during discharge. In some embodiments, the CID 300 might be activated if the electrochemical cell experiences a build-up of gas due to the electrochemical reactions occurring in the cell and if the gas causes damage to the CID 300 during a gas-related cell failure event. In some embodiments, the CID 300 might be activated if a solvent electrolyte from one electrode of the electrochemical cell leaks across a separator to the other electrode and causes the electrochemical cell to discharge the other electrode or current collector thereof. In some embodiments, heat from the anode reaction may increase the operating temperature of the electrochemical cell, which may cause the breakdown of the organic solvents used as the electrolyte, releasing flammable hydrocarbon gases and building up pressure in the cell. In some embodiments, the flammable hydrocarbon gases can ignite, causing a small fire and damaging the cell but not causing catastrophic failure. In some embodiments, the CID 300 can be activated in such instances to discontinue charging or discharging of the electrochemical cell so that further anode reaction does not occur, discontinuing further gas build-up in the cell. In each of these and many other battery failure conditions, the CID 300 described herein can be activated and current safely disconnected across the cathode tab and/or the anode tab.

Figure 9:
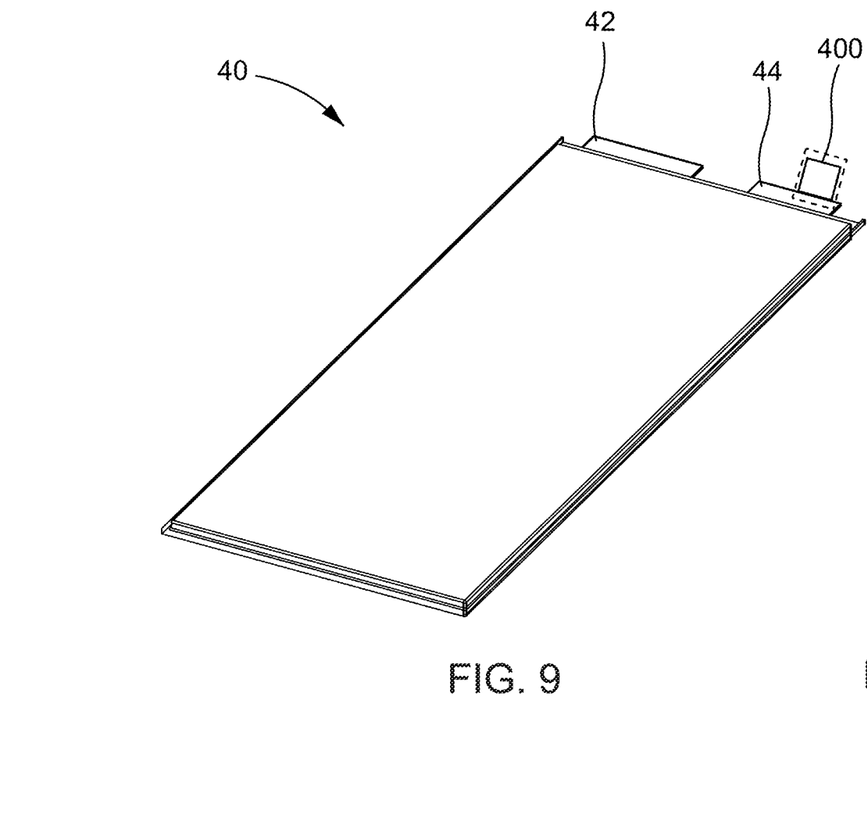
FIG. 9 illustrates an electrochemical cell including a current interrupt device, according to an embodiment.
Figure 10:
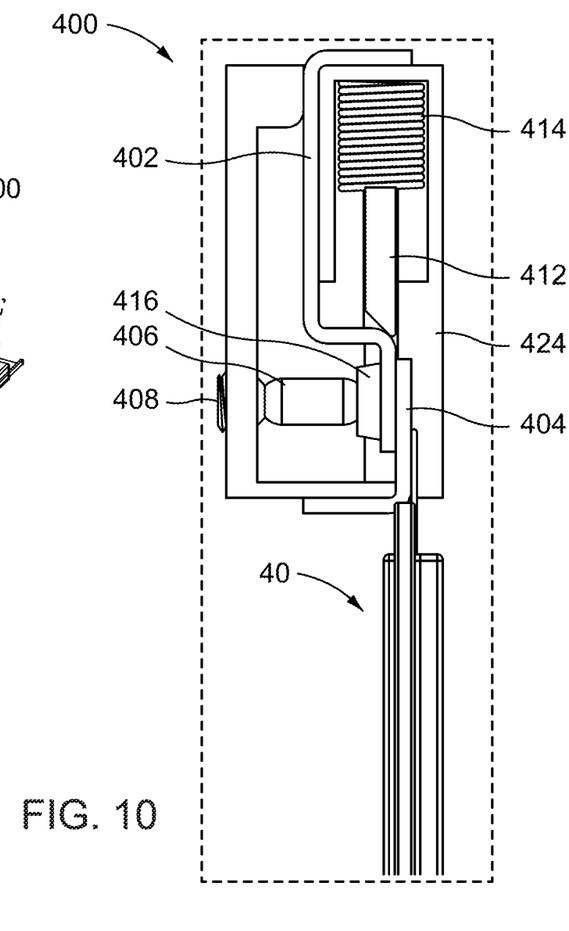
FIG. 10 illustrates an interior view of a current interrupt device, according to an embodiment.

FIGS. 9 and 10 show an electrochemical cell 40 having a cathode tab 42, an anode tab 44, and a current interrupt device 400 (CID 400), the CID 400 configured to protect the electrochemical cell 40 from least one of an over-current condition, an over-voltage condition, and an over-temperature condition within the electrochemical cell 40. In some embodiments, the CID 400 can be positioned nearby one of the cathode tab 42 and the anode tab 44 such that when the CID 400 is activated, electrical current through at least one of the cathode tab 42 and the anode tab 44 is discontinued. In some embodiments, the CID 400 can be electrically integrated into the cathode tab 42 or the anode tab 44. In some embodiments, one of the cathode tab 42 and the anode tab 44 can include two portions interposed by the CID 400 such that all electrical current passing through the cathode tab 42 or the anode tab 44 also passes through the CID 400.

In some embodiments, the CID 400 can include a breaking contact 402 and a fixed contact 404 positioned and configured to be in electrical contact during normal operation of the electrochemical cell 40. In some embodiments, the CID 400 can include a frangible bulb 406 configured to hold the breaking contact 402 in electrical contact with the fixed contact 404 due to the dimensions and position of the frangible bulb 406 within the CID 400. The frangible bulb 406 can be substantially similar to the frangible bulb 106 described above and is therefore not described in further detail here. In some embodiments, the frangible bulb 406 can include a liquid and/or a gas that expands due to increased temperatures such that the frangible bulb 406 is configured to break at or above a particular temperature threshold.

In some embodiments, the CID 400 can include a contact pad 416 positioned between the breaking contact 402 and the frangible bulb 406 such that the frangible bulb 406 is less susceptible to current-related or vibratory failure when the electrochemical cell 40 is operating normally. In some embodiments, the CID 400 can include an enclosure 424 having an orifice (not shown) through which the frangible bulb 406 can be inserted into the CID 400. In some embodiments, the CID 400 can include a set screw 408 that is inserted into the orifice and that is configured to keep the frangible bulb 406 in place within the CID 400. In some embodiments, current resistance can be controlled by contact geometry, material, and/or an in-line resistor. In some embodiments, the CID 400 can include a diode (e.g., diode 120), a heating element (e.g., heating element 122), and/or a resistor (e.g., 118).

In some embodiments, the CID 400 can include a shutter 412 having a distal end configured to be interposed between the breaking contact 402 and the fixed contact 404 when the CID 400 is activated. In some embodiments, the CID 400 can include a spring 414 operably coupled to the shutter 412 and configured to supply sufficient force to the shutter 412 to interpose the shutter 412 between the breaking contact 402 and the fixed contact 404 when the CID 400 is activated. In some embodiments, the distal end of the shutter 412 can taper and/or can include a blade such that the force supplied by the movement of the shutter 412 upon activation of the CID 400 is sufficient to interpose the shutter 412 between the breaking contact 402 and the fixed contact 404. In some embodiments, interposing the shutter 412 between the breaking contact 402 and the fixed contact 404 can include deformation or movement of the breaking contact 402. In some embodiments, when the temperature of the gas and/or the liquid within the frangible bulb 406 equals or exceeds the temperature threshold, the frangible bulb 406 breaks, allowing the force of the preloaded spring 414 to cause the shutter 412 to be interposed between the breaking contact 402 and the fixed contact 404.

In some embodiments, the frangible bulb 406 can be positioned in the CID 400 by inserting the frangible bulb 406 through an aperture (not shown) in the CID 400 and can be removably sealed into place by inserting a set screw 408 into the aperture. In some embodiments, the frangible bulb 406 can be positioned within the CID 400 before the CID 400 is coupled to the electrochemical cell 40. In some embodiments, the CID 400 can be coupled to the electrochemical cell 40 and the frangible bulb 406 can subsequently be positioned within the CID 400. In some embodiments, the CID 400 can include a tensioning ribbon (not shown) connected to one of the shutter 412 and the spring 414, and extending through the enclosure 424 of the CID 400. In some embodiments, when setting the CID 400, the shutter 412 and the spring 414 can be positioned to accommodate the frangible bulb 406 by pulling on the tensioning ribbon, positioning the breaking contact 402 in electrical contact with the fixed contact 404, inserting the frangible bulb 406 through the aperture in the CID 400, and inserting the set screw 408 into the aperture to seal the frangible bulb 406 in place.

In some embodiments, since the CID 400 can be integrated into the cathode tab 42 or the anode tab 44, if the frangible bulb 406 breaks for whatever reason during normal operation of the electrochemical cell 40, the electrochemical cell 40 will discontinue operation. It can be helpful then, in some embodiments, to include more than one frangible bulb 406 such that if some but not all of the frangible bulbs 406 break, the CID 400 will continue to allow current through the cathode tab 42 or the anode tab 44 and normal operation of the electrochemical cell 40 will continue.

In some embodiments, the CID 400 can operate by disconnecting electrical connection between the breaking contact 402 and the fixed contact 404 due to at least one of over-temperature conditions, overcurrent conditions, overvoltage conditions, short-circuit conditions, overcharging, physical damage to the CID 400, or thermal runaway of the electrochemical cell. In some embodiments, the CID 400 can be activated when only one of these conditions exist. For instance, in some embodiments, the CID 400 might be activated if the electrochemical cell is simply overcharged but is otherwise operating properly during discharge. In some embodiments, the CID 400 might be activated if the electrochemical cell experiences a build-up of gas due to the electrochemical reactions occurring in the cell and if the gas causes damage to the CID 400 during a gas-related cell failure event. In some embodiments, the CID 400 might be activated if a solvent electrolyte from one electrode of the electrochemical cell leaks across a separator to the other electrode and causes the electrochemical cell to discharge the other electrode or current collector thereof. In some embodiments, heat from the anode reaction may increase the operating temperature of the electrochemical cell, which may cause the breakdown of the organic solvents used as the electrolyte, releasing flammable hydrocarbon gases and building up pressure in the cell. In some embodiments, the flammable hydrocarbon gases can ignite, causing a small fire and damaging the cell but not causing catastrophic failure. In some embodiments, the CID 400 can be activated in such instances to discontinue charging or discharging of the electrochemical cell so that further anode reaction does not occur, discontinuing further gas build-up in the cell. In each of these and many other battery failure conditions, the CID 400 described herein can be activated and current safely disconnected across the cathode tab and/or the anode tab.

While various embodiments have been described above, it should be understood that they have been presented by way of example only, and not limitation. Where schematics and/or embodiments described above indicate certain components arranged in certain orientations or positions, the arrangement of components may be modified. While the embodiments have been particularly shown and described, it will be understood that various changes in form and details may be made. Although various embodiments have been described as having particular features and/or combinations of components, other embodiments are possible having a combination of any features and/or components from any of embodiments described herein.

The specific configurations of the various components can also be varied. For example, the size and specific shape of the various components can be different from the embodiments shown, while still providing the functions as described herein. More specifically, the size and shape of the various components can be specifically selected for a desired or intended usage. Thus, it should be understood that the size, shape, and/or arrangement of the embodiments and/or components thereof can be adapted for a given use unless the context explicitly states otherwise.

Where methods and/or events described above indicate certain events and/or procedures occurring in certain order, the ordering of certain events and/or procedures may be modified. Additionally, certain events and/or procedures may be performed concurrently in a parallel process when possible, as well as performed sequentially as described above.

The invention claimed is:

1. A current interrupt device, comprising:
   a frangible bulb;
   a fixed contact; and
   a breaking contact configured to be held in electrical contact with the fixed contact by the frangible bulb in a first configuration, and to be electrically disconnected from the fixed contact in a second configuration after the frangible bulb breaks;
   wherein the frangible bulb is disposed proximate an electrochemical cell such that a temperature of the frangible bulb is substantially similar to an operating temperature of the electrochemical cell; and
   wherein the frangible bulb is configured to break when the operating temperature of the electrochemical cell exceeds a threshold temperature.

2. The current interrupt device of claim 1, wherein the frangible bulb is configured to break at a temperature threshold.

3. The current interrupt device of claim 1, wherein the current interrupt device is electrically coupled to an anode tab of an electrochemical cell.

4. The current interrupt device of claim 1, wherein the current interrupt device is electrically coupled to a cathode tab of an electrochemical cell.

5. The current interrupt device of claim 1, further comprising:
   a resistor disposed and configured to heat the frangible bulb to above a threshold temperature when current passing through the breaking contact reaches a current threshold.

6. The current interrupt device of claim 1, further comprising:
   a heating element; and
   a diode, the diode configured to keep the heating element disconnected from current below a voltage threshold.

7. The current interrupt device of claim 6, wherein the diode connects the heating element to a circuit once the voltage reaches or exceeds the voltage threshold.

8. The current interrupt device of claim 7, wherein the heating element is configured to heat the frangible bulb to above a temperature threshold.

9. The current interrupt device of claim 1, wherein the breaking contact is configured to bend, rotate and/or deform about a hinge to move from the first configuration to the second configuration.

10. A current interrupt device, comprising:
    a frangible bulb;
    a fixed contact; and
    a breaking contact configured to be held in electrical contact with the fixed contact by the frangible bulb in a first configuration, and to be electrically disconnected from the fixed contact in a second configuration after the frangible bulb breaks, the breaking contact configured to bend, rotate and/or deform about a hinge to move from the first configuration to the second configuration;
    wherein the frangible bulb is disposed proximate an electrochemical cell such that a temperature of the frangible bulb is substantially similar to an operating temperature of the electrochemical cell; and
    wherein the frangible bulb is configured to break when the operating temperature of the electrochemical cell exceeds a threshold temperature.

11. The current interrupt device of claim 10, wherein the frangible bulb is configured to break when an operating temperature of an electrochemical cell exceeds a threshold temperature.

12. The current interrupt device of claim 10, further comprising:
    a heating element disposed and configured to heat the frangible bulb to above a threshold temperature when current passing through the breaking contact reaches a current threshold.

13. The current interrupt device of claim 12, wherein the heating element is a resistor.

14. The current interrupt device of claim 12, further comprising:
    a diode configured to keep the heating element disconnected from a circuit below a voltage threshold.

15. The current interrupt device of claim 14, wherein the diode connects the heating element to the circuit once the voltage reaches or exceeds the voltage threshold.

16. A current interrupt device, comprising:
    a frangible bulb configured to break at a temperature threshold;
    a fixed contact;
    a breaking contact configured to be held in electrical contact with the fixed contact by the frangible bulb in a first configuration, and to be electrically disconnected from the fixed contact in a second configuration after the frangible bulb breaks; and
    a heating element configured to heat the frangible bulb to above the temperature threshold;

wherein the frangible bulb is disposed proximate an electrochemical cell such that a temperature of the frangible bulb is substantially similar to an operating temperature of the electrochemical cell; and wherein the frangible bulb is configured to break when the operating temperature of the electrochemical cell exceeds a threshold temperature.

17. The current interrupt device of claim 16, wherein the heating element is configured to heat the frangible bulb to above the temperature threshold when the operating temperature of the electrochemical cell exceeds the threshold temperature.

18. The current interrupt device of claim 16, wherein the heating element is configured to heat the frangible bulb to above the temperature threshold when a current threshold and/or a voltage threshold is reached or exceeded.

* * * * *